US009167938B2

(12) United States Patent
Benoit et al.

(10) Patent No.: US 9,167,938 B2
(45) Date of Patent: Oct. 27, 2015

(54) FOOD PROCESSOR MIXER ATTACHMENT (71) Applicant: Whirlpool Corporation, Benton Harbor, MI (US)

(72) Inventors: Kaitlyn M. Benoit, St. Joseph, MI (US); Jason M. Cassar, Mattawan, MI (US); Michael P. Conti, St. Joseph, MI (US); Jason L. Hollinger, Arcanum, OH (US); Everett Sidney Kettle, Portage, MI (US); Zachary A. Lownds, St. Joseph, MI (US); Casey L. McCuan, St. Joseph, MI (US); Leif A. Norland, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 68 days.

(21) Appl. No.: 14/075,389

(22) Filed: Nov. 8, 2013

(65) Prior Publication Data
US 2014/0263783 A1    Sep. 18, 2014

Related U.S. Application Data (60) Provisional application No. 61/792,945, filed on Mar. 15, 2013.

(51) Int. Cl.
*A47J 43/04* (2006.01)
*A47J 43/07* (2006.01)
(Continued)

(52) U.S. Cl.
CPC ............ *A47J 43/0705* (2013.01); *A47J 43/044* (2013.01); *A47J 43/06* (2013.01)

(58) Field of Classification Search
CPC ..... A47J 43/255; A47J 43/046; A47J 43/085; A47J 19/00; A47J 19/005; A47J 19/06; A47J 43/06; A47J 43/0711; A47J 43/044; A47J 43/0705

USPC .................. 241/92, 278.1, 101.01
See application file for complete search history.

(56) References Cited

U.S. PATENT DOCUMENTS 3,352,339 A    11/1967    Moline
3,416,583 A    12/1968    Bricker
(Continued)

FOREIGN PATENT DOCUMENTS

CN    202355273 U    8/2012
DE        971304 C    1/1959
(Continued)

OTHER PUBLICATIONS

European Patent Application No. 14158633.9 filed Mar. 10, 2014, Applicant: Whirlpool Corporation, European Search Report re: Same, mail date: Jul. 8, 2014.

(Continued)

*Primary Examiner* — Faye Francis (57) ABSTRACT

A food processor attachment assembly for a stand mixer includes a coupling hub adapted to be received in an attachment hub of the stand mixer. A gear housing includes a gearing mechanism disposed therein to translate an output drive from the attachment hub to the coupling hub to drive an output shaft along a vertical rotational axis. The output drive is accessible at a coupling portion for attaching to various food processing discs as housed within a top housing assembly. The output drive is further accessible for coupling to the food processing attachment at a lower coupling portion for powering food processing attachments within a bowl assembly.

19 Claims, 9 Drawing Sheets

(51) Int. Cl.
*A47J 43/06* (2006.01)
*A47J 43/044* (2006.01)

(56) References Cited

U.S. PATENT DOCUMENTS

| | | | |
|---|---|---|---|
| 4,325,643 | A | 4/1982 | Scott et al. |
| 5,396,836 | A | 3/1995 | Kim |
| 5,588,496 | A | 12/1996 | Elger |
| 6,142,905 | A | 11/2000 | Brown et al. |
| 7,229,036 | B2 * | 6/2007 | Carnevale et al. ............. 241/36 |
| 7,387,430 | B2 | 6/2008 | Short et al. |
| 2002/0079393 | A1 * | 6/2002 | Karkos et al. ................... 241/92 |
| 2003/0197080 | A1 * | 10/2003 | Karkos et al. ................... 241/92 |
| 2010/0058941 | A1 | 3/2010 | Rivera |
| 2013/0074707 | A1 | 3/2013 | Asbury et al. |
| 2013/0074708 | A1 | 3/2013 | Asbury et al. |
| 2013/0220764 | A1 | 8/2013 | Choi et al. |

FOREIGN PATENT DOCUMENTS

| | | |
|---|---|---|
| EP | 2497393 A1 | 9/2012 |
| GB | 664634 | 1/1952 |
| GB | 670543 | 4/1952 |
| GB | 2465834 A | 6/2010 |
| WO | 2011010350 A2 | 9/2011 |
| WO | 2012165713 A1 | 6/2012 |
| WO | 2013185677 A1 | 12/2013 |

OTHER PUBLICATIONS

European Patent Application No. 14160283.9 filed Mar. 17, 2014, Applicant: Whirlpool Corporation, European Search Report re: Same, mail date May 15, 2014.

European Patent Application No. 14160280.5 filed Mar. 17, 2014, Applicant: Whirlpool Corporation, European Search Report re: Same, mail date May 15, 2014.

* cited by examiner

FOOD PROCESSOR MIXER ATTACHMENT

CROSS-REFERENCE TO RELATED APPLICATION

This application claims priority to and the benefit under 35 U.S.C. §119(e) of U.S. Provisional Patent Application No. 61/792,945, filed on Mar. 15, 2013, entitled "HIGH PERFORMANCE ADJUSTABLE JUICER WITH WHOLE FOODS FEED CHUTE AND OVERLOAD CLUTCH DRIVE MECHANISM," the entire disclosure of which is incorporated herein by reference.

FIELD

The present disclosure relates to a food processing attachment, and more particularly, to a food processing attachment as used in conjunction with a stand mixer.

BACKGROUND

A typical household food processor generally requires a pre-processing of the food prior to introduction into the food processor to reduce the size and shape of the food. These devices generally do not lend themselves to being able to process whole or uncut foods (such as a Kiwi fruit) due to the smaller mouth feed chutes and a lack of torque to handle tougher foods. Additionally, existing household food processors often come with multiple cutting tools that require manual interchanging in order to provide for a selected food configuration. Lastly, food overloading of these food processors due to wedged food items or increased friction between food in substrates and the cutting tools, can cause an internal rotating assembly mechanism to seize, or housing parts (such as lids) to come off or become damaged, causing leakage due to the high pressure.

Therefore, there is a need in the small appliance art for an efficient and compact high performance adjustable food processor configured to process small whole foods while reducing or preventing an overload condition on the drive motor during a dicing procedure.

SUMMARY

One aspect of the present disclosure includes a food processor attachment assembly adapted to be mounted as an attachment to a stand mixer, wherein the stand mixer includes a motor and an attachment hub having a drive outlet that is driven by the motor disposed within the stand mixer. The food processor attachment includes a gear housing having a coupling hub adapted to couple to the attachment hub of the stand mixer. The gear housing includes an upper portion and a lower portion and houses a gear mechanism in assembly. The gear mechanism is engaged in a driven relationship with the drive outlet of a stand mixer at a first end and further coupled to an output drive shaft at a second end. A top housing assembly includes a base portion and an upwardly extending feed chute. The top housing assembly is removably mounted on the upper portion of the gear housing at the base portion. A bowl assembly includes a receptacle portion and is removably mounted on the lower portion of the gear housing. The output drive shaft is adapted to rotate on a vertical axis, wherein the output drive shaft includes an upper portion accessible from the upper portion of the gear housing, and a lower portion accessible from the lower portion of the gear housing. The upper and lower portions of the output drive shaft are adapted to couple to and drive food processing attachments in assembly.

In another embodiment of the present disclosure, a food processor attachment includes a top housing assembly and a bowl assembly which are each mounted to opposite ends of a gear housing. A coupling hub is disposed on the gear housing and adapted to couple to a rotary drive outlet of an appliance, wherein the appliance includes a motor adapted to drive the rotary drive outlet. An output drive is disposed within the gear housing and is engaged in a driven relationship with the drive outlet of the appliance to rotate the output drive within the gear housing.

Yet, another aspect of the present disclosure includes a food processor attachment assembly adapted to be mounted as an attachment to a stand mixer, wherein the stand mixer includes a motor, an attachment hub, and a drive outlet disposed in the attachment hub. The motor is adapted to power the drive outlet and the food processor attachment. The food processor attachment includes a gear housing having a coupling hub adapted to couple to the attachment hub of the stand mixer. A top housing assembly is removably mounted to an upper portion of the gear housing. A bowl assembly is removably mounted to a lower portion of the gear housing. A vertically disposed output drive is housed within the gear housing and in driven engagement with the outlet drive of the stand mixer to rotate the output drive along a vertical axis. The output drive is at least partially disposed in the bowl assembly. A food processing attachment is removably coupled to the output drive for processing a food substrate in a receptacle portion of the bowl assembly.

These and other features, advantages, and objects of the present device will be further understood and appreciated by those skilled in the art by reference to the following specification, claims, and appended drawings.

DETAILED DESCRIPTION

Figure 1:
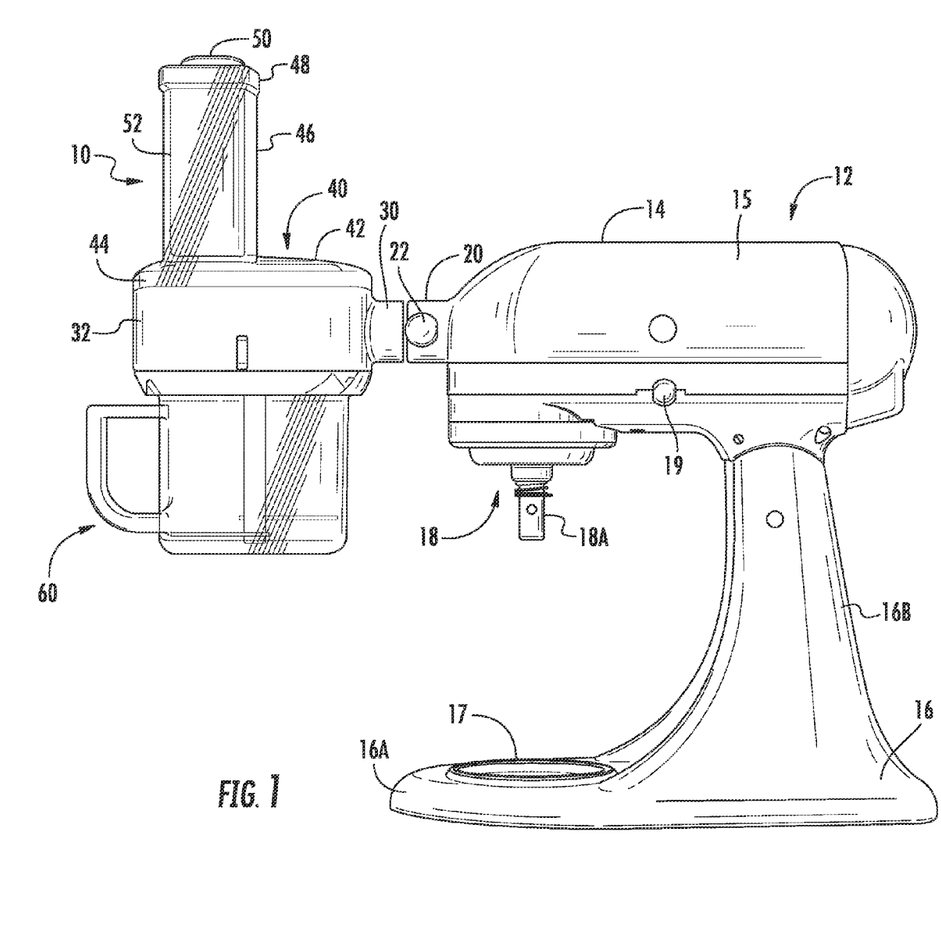
FIG. 1 is a side elevational view of a stand mixer having a food processor attachment according to one embodiment of the present disclosure.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations except for expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally indicates a food processor attachment as used with a countertop stand mixer 12. The stand mixer 12 includes an articulating upper arm 14 and an external housing 15 which houses a motor therein. The stand mixer 12 further includes a base portion 16 which is weighted to support the leverage realized on the stand mixer 12 when the food processor attachment 10 is coupled thereto. The base portion 16 includes an upwardly extending support arm 16B and a bowl receiving landing 16A giving the base portion 16 an overall L-shaped configuration. A bowl locking mechanism 17 is disposed on the bowl receiving landing 16A which is directly below a mixing assembly 18 having a mixer shaft coupling 18A. The stand mixer 12 further includes an arm locking mechanism 19 which is adapted to lock the articulating upper arm 14 in an in-use or operational position shown in FIG. 1.

As further shown in FIG. 1, the stand mixer 12 includes an attachment hub 20 disposed on a front-most portion of the articulating arm 14. The attachment hub 20 includes a locking mechanism 22 adapted to lock attachments in place as mounted on the stand mixer 12. As noted above, the external housing 15 houses a drive motor which is adapted to power the mixer shaft coupling 18A as well as a rotating drive outlet disposed within the attachment hub 20. In this way, the drive motor of the stand mixer 12 is adapted to power both mixing and attachment-based processes.

Figure 2A:
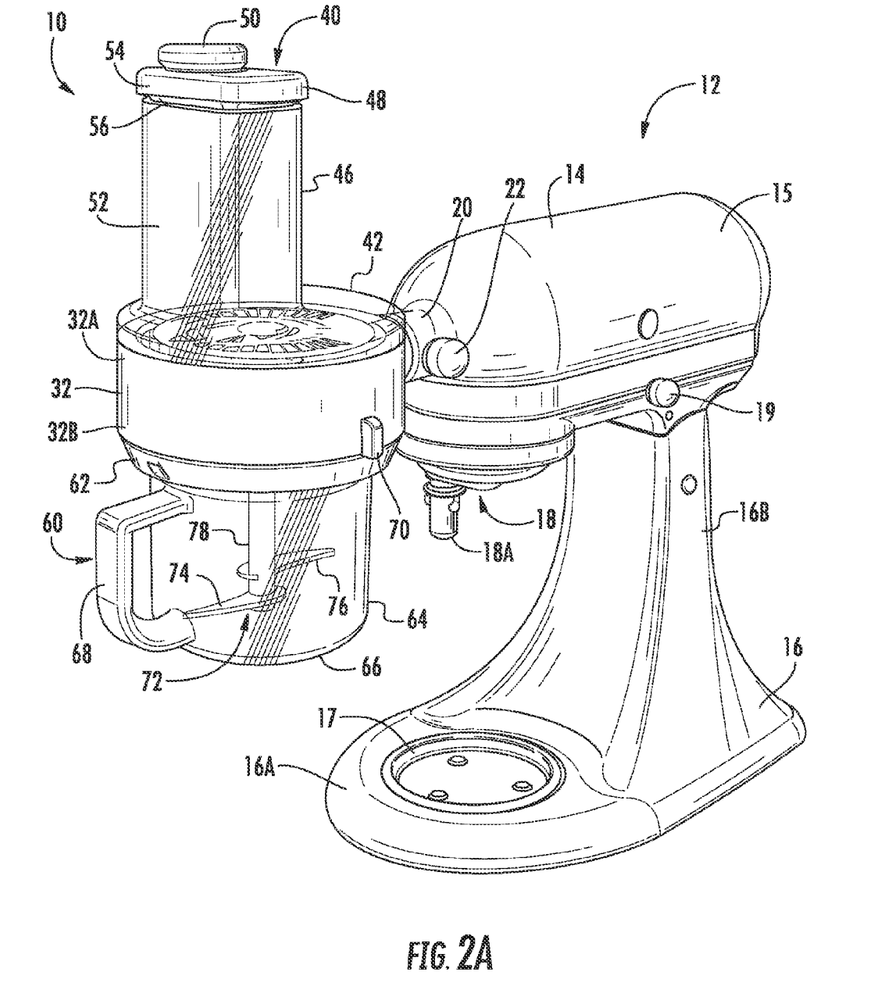
FIG. 2A is a front perspective view of the stand mixer and food processor attachment of FIG. 1.

Referring now to FIGS. 1 and 2A, the food processor attachment 10 includes a coupling hub 30 that is adapted to couple the attachment hub 20 of the stand mixer 12. In this way, the motor of the stand mixer 12 can translate power through the attachment hub 20 to the coupling hub 30. It is contemplated that the attachment hub 20 serves as a drive outlet providing driving speeds and torques that are appropriate for the function of the food processor attachment 10. The food processor attachment 10 further includes a gear housing 32 which houses a gearing mechanism adapted to receive a rotational drive provided to the coupling hub 30 as translated from the attachment hub 20 of the mixer 12, and further described below. As shown in FIG. 1, a top housing assembly 40 includes a base portion 42 having a lip 44. It is contemplated that the lip 44 comprises engagement features, such as twist and lock or snap-fit engagement features, to couple the top housing 40 to the gear housing 32. Extending upwardly from the base portion 42 of the top assembly 40, a feed chute 46 is disposed which is adapted to feed a food substrate along a food processing path as further described below. As shown in FIG. 2A, first and second food pushers 48, 50 define a food pusher assembly adapted to be received in the feed chute 46 to urge food along the food processing path. The first food pusher 48 includes a body portion 52 and a top cap 54 that acts as a stop against a rim 56 of the feed chute 46. The second food pusher assembly 50 is adapted to be slideably received in a slot formed within the body portion 52 of the first food pusher 48, such that the second food pusher assembly 50 can be used for smaller sized food substrates. It is contemplated that the body portion 52 of the first food pusher 48 has a specific geometry and cross-section that mirrors the cross-section of the feed chute 46, such that the body portion 52 of the first food pusher assembly 48 is slideably received within the feed chute 46 and substantially fills the entirety of an interior of the feed chute 46 as disposed therein.

As shown in FIG. 2A, a bowl assembly 60 includes an upper lip portion 62 and a receptacle portion 64. The bowl assembly 60 is adapted to couple to a lower portion 32B of the gear housing 32. In this way, the top housing assembly 40 couples to an upper portion 32A of the gear housing 32, while the bowl assembly 60 couples to a lower portion 32B and opposite side of the gear housing 32. A receptacle portion 64 includes a bottom surface 66 and a handle member 68 extending outwardly therefrom. It is contemplated that the lip portion 62 of the bowl assembly 60 includes engagement features used to couple the bowl assembly 60 to the lower portion 32B of the gear housing 32. A bowl release latch 70 is disposed along the lower portion 32B of the gear housing 32 in the embodiment shown in FIG. 2A, and is adapted to release the bowl assembly 60 from the gear housing 32. As further shown in FIG. 2A, the bowl assembly 60 includes a food processing attachment 72 in the form of an S-blade having first and second blade portions 74, 76 which are coupled to a drive shaft 78. Food processing attachment 72 is adapted to chop a food substrate as received in the bowl assembly 60. In the configuration shown in FIG. 2, the food processor attachment 10 is adapted to process food as fed through the feed chute 46 into the receptacle portion 64 of the bowl assembly 60. As received in the receptacle portion 64, the food substrate will be processed by the food processor attachment 72 as the blade portions 74, 76 rotate on drive shaft 78 within the receptacle portion 64.

Figure 2B:
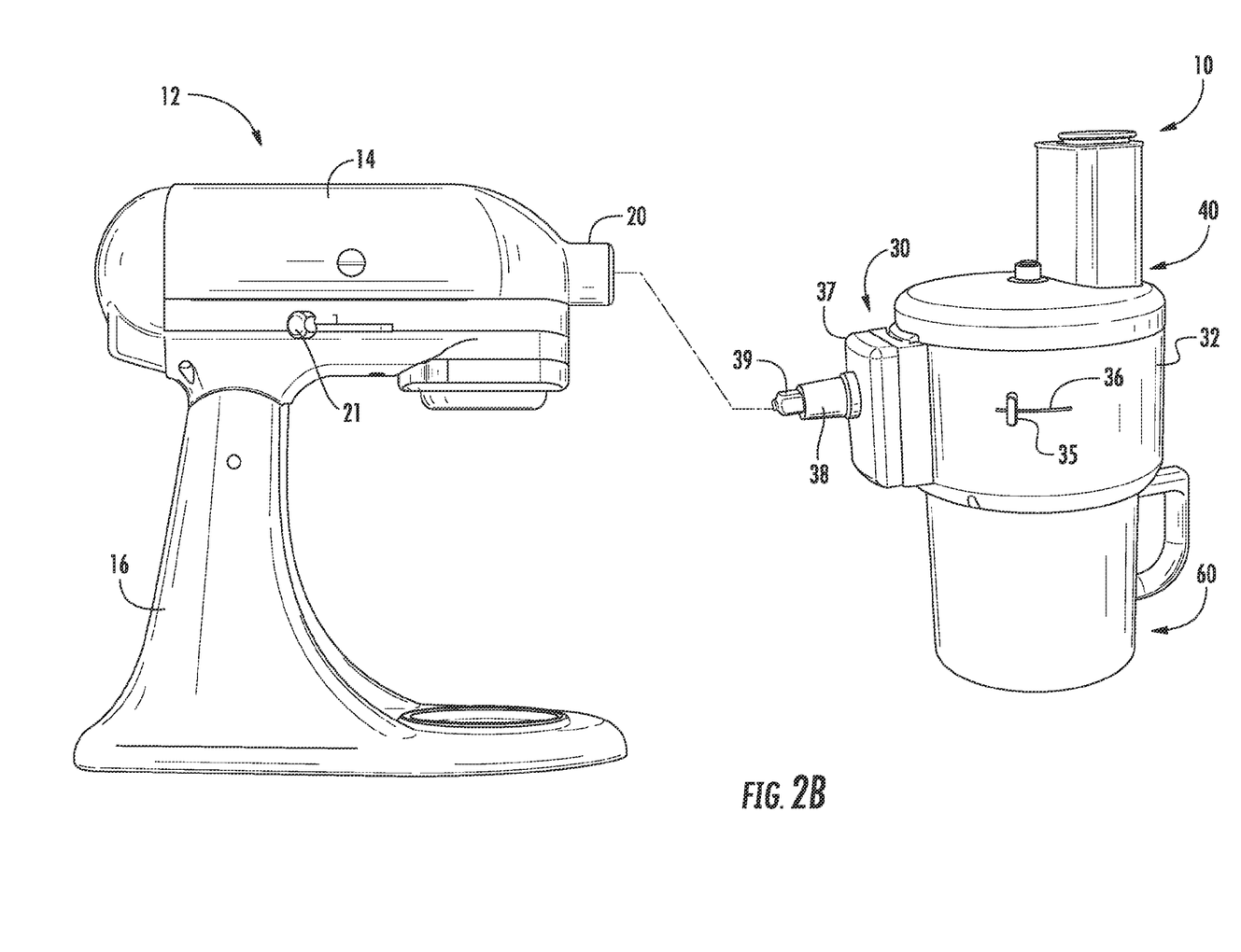
FIG. 2B is a rear perspective view of FIG. 2A with the food processor attachment exploded away.

Referring now to FIG. 2B, the food processor attachment 10 is shown exploded away from the stand mixer 12. In the view shown in FIG. 2B, the gear housing 32 includes an external lever 35 which is adapted to move laterally within a slot 36 disposed on the gear housing 32 to adjust the position of food processing discs disposed within the gear housing 32, as further described below. The food processor attachment 10 also includes a hub housing 37 extending laterally off the gear housing 32 which houses a gearing mechanism adapted to power a drive shaft 38 having a square drive coupling 39. In assembly, the drive shaft 38 and the square coupling 39 are adapted to couple to the drive outlet disposed within the attachment hub 20 to the stand mixer 12 in a driven engagement for powering the food processor attachment 10. As further shown in FIG. 2B, the stand mixer 12 includes a power and speed selection lever 21 disposed on the upper arm 14. In use, the lever 21 is engaged by a user to power the stand mixer 12 at various speeds which translates to the drive outlet disposed within the attachment hub 20.

Figure 3:
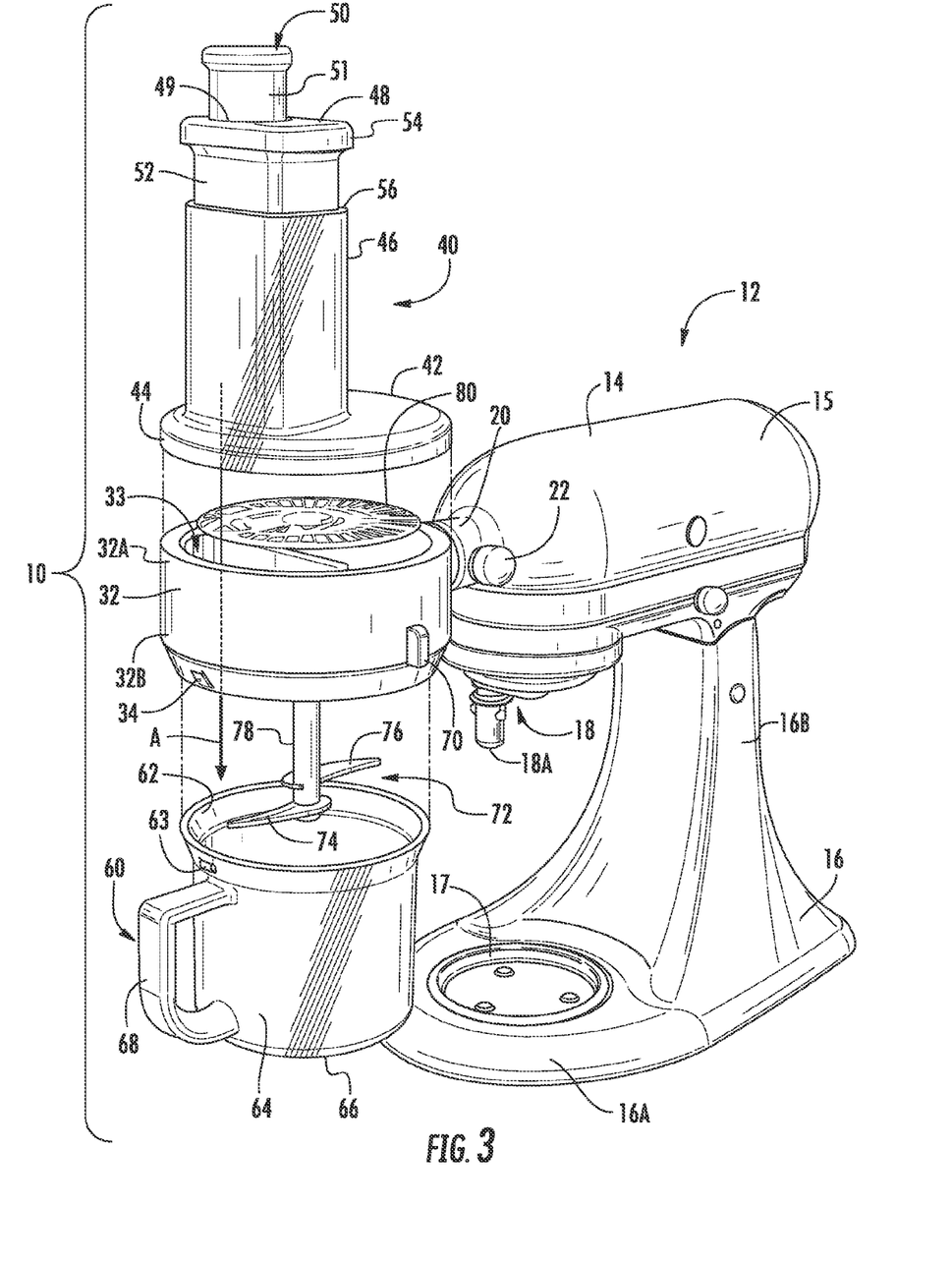
FIG. 3 is a front perspective view of the stand mixer and food processor attachment of FIG. 2 showing the food processor attachment.

Referring now to FIG. 3, the food processor attachment 10 is shown in an exploded view, wherein the top housing assembly 40 and the bowl assembly 60 are detached from the gear housing 32 and a food processing path A, as indicated. As shown in FIG. 3, the food processing path A extends from the feed chute 46 through a feed aperture 33 disposed within the gear housing 32. The feed aperture 33 opens into the receptacle 64 of the bowl assembly 60. In the embodiment shown in FIG. 3, the lower portion 32B of the gear housing 32 includes an alignment feature 34 which is adapted to be received within an aperture 63 disposed on the lip portion 62 of the bowl assembly 60. In this way, the alignment feature 34 is adapted to provide tactile feedback to the user to help ensure the bowl assembly 60 is properly aligned and coupled to the gear housing 32. In the exploded view shown in FIG. 3, the feed aperture 33, extending through the gear housing 32, is shown having a similar configuration to the cross-section of the feed chute 46. As further shown in FIG. 3, with the top housing assembly 40 removed from the gear housing 32, a food processing disc 80 is shown. The food processing disc 80 can be any one of a variety of food processing discs that is coupled to a gear mechanism housed within the gear housing 32 to rotate within the food processing path A. In this way, the food processing disc 80 is adapted to process a food substrate as fed along the food processing attachment 10 through feed chute 46. Once processed by the food processing disc 80, the processed food substrate will pass through the aperture 33 disposed in the gear housing 32 and then be received in the receptacle portion 64 of the bowl assembly 60 for further processing by food processing attachment 72. Both the food processing attachment 72 and the food processing disc 80 are detachably or removably secured to an output drive shaft 100 disposed within the gear housing 32 as further described below. Thus, the food processing attachment 10 is adapted to provide food processing features from the food processing attachment 72 or the food processing disc 80 either individually or together.

Figure 4:
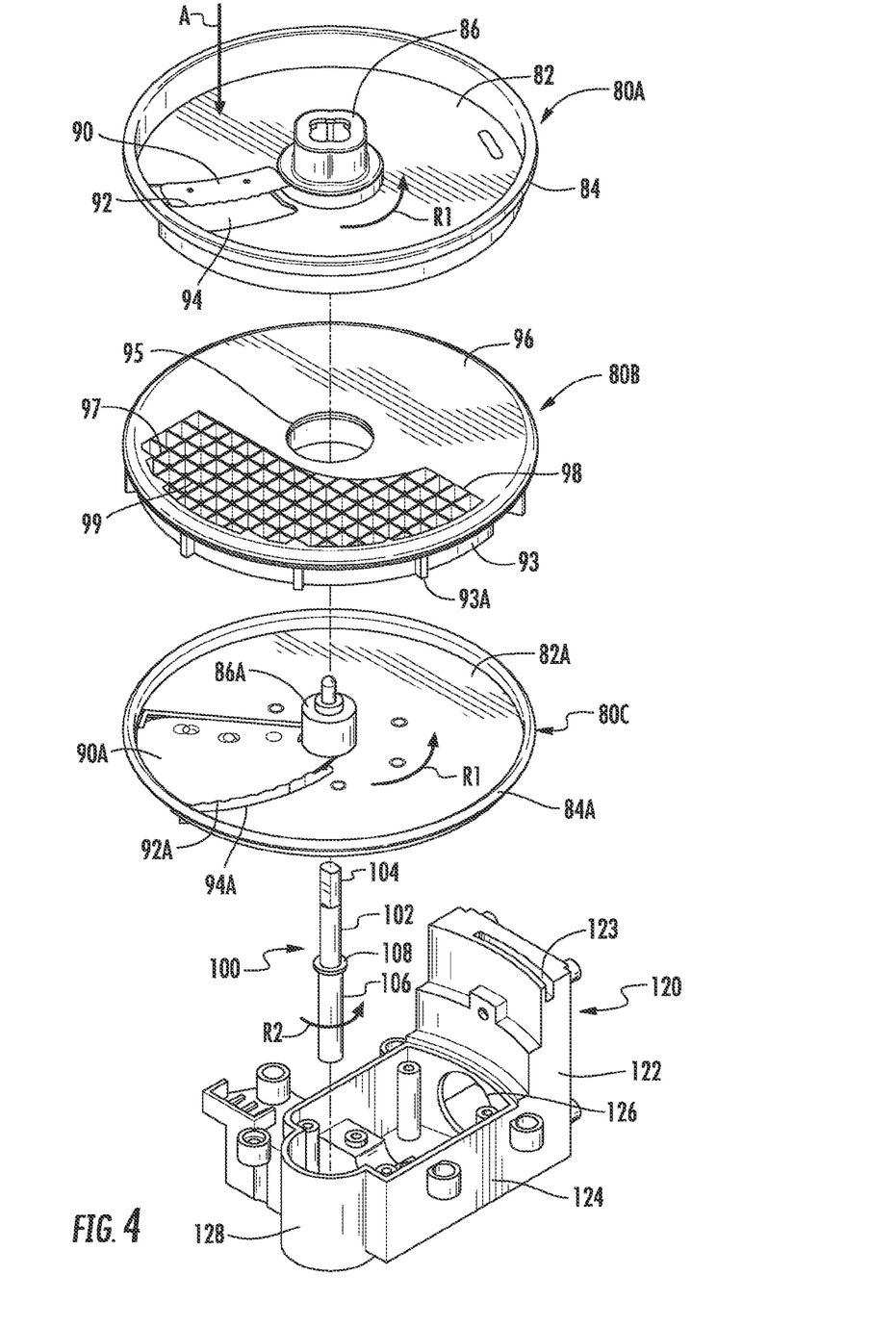
FIG. 4 is an exploded perspective view of a coupling assembly and various disc attachments.

Referring now to FIG. 4, a variety of food processing discs 80A, 80B, and 80C are shown. Referring to food processing disc 80A, a generally planar body portion 82 is shown having a collar or lip portion 84 disposed thereabout a perimeter of the planar body portion 82. An attachment portion 86 is disposed in the center of the planar body portion 82 which is adapted to couple to an output drive shaft 100 as further described below. In use, the output drive shaft 100 is adapted to drive the food processing disc 80A along a rotational path indicated by arrow R1. Disposed on the planar body portion 82, a raised blade assembly 90 includes a blade portion 92 which is disposed over an aperture 94 which opens through the planar body portion 82 of the disc 80A. Thus, as the disc 80A rotates along the rotational path R1, the blade assembly 90 rotates through the food processing path A within the base portion 42 of the top housing assembly 40 and contacts a food substrate to slice the food substrate at a predetermined thickness.

Referring now to food processing disc 80B, a generally planar body portion 96 includes a collar portion 93 extending downwardly therefrom, wherein the collar portion 93 includes alignment features 93A which are adapted to properly seat the food processing disc 80B within the food processing attachment 10 of the present disclosure. A central aperture 95 is disposed on the generally planar body portion 96 and is appropriately sized such that the food processing attachment disc 80B is a stationary food processing disc as used with the food processing attachment 10. A dicing grid 98 is disposed within the generally planar body portion 96 of disc 80B and includes dicing elements 97, 99 which are generally perpendicular to each other, thereby forming a grid-like pattern adapted to process a food substrate in a configuration correlating to the grid pattern, such as long food strips known as julienne slices. It is contemplated that the food processing disc 80A and food processing disc 80B may be used in combination to provide generally diced food pieces in the food processing attachment 10 of the present disclosure. Alignment features 93A help to secure the food processing disc 80B in a stationary position within the gear housing 32 when the disc 80B is used in conjunction with a kinetic or rotary disc, such as food processing discs 80A and 80C.

As further shown in FIG. 4, food processing disc 80C includes a generally planar body portion 82A having a lipped portion 84A disposed about a perimeter thereof. A central attachment feature 86A is provided to couple the food processing attachment disc 80C to output drive shaft 100 in assembly. As coupled to the output drive shaft 100, the food processing attachment disc 80C is adapted to rotate along a rotational path as indicated by arrow R1. The food processing attachment disc 80C further includes a raised blade assembly 90A having a blade portion 92a disposed above an aperture 94a which opens through the generally planar body portion 82A. In a similar fashion noted above with reference to food processing disc 80A, food processing disc 80C is adapted to rotate the blade assembly 90A through the food processing path A as a food substrate is fed through the food processing attachment 10. As shown in FIG. 4, blade assembly 90 and blade assembly 90A are adapted to provide a sliced food substrate of varying thickness. It is further contemplated that rotational disc 80C may be used in combination with stationary disc 80B for providing a diced food substrate of a different configuration as compared to the combination of food processing discs 80A, 80B. Other food processing attachments will be appreciated by those skilled in the art for use with the present disclosure, including double-sided shaving blades, julienne slicing blades, French fry slicing blades, and other like assemblies.

As further shown in FIG. 4, output drive shaft 100 is a generally vertical shaft including an upper portion 102 having an engagement portion 104, and a lower portion 106 which is separated from the upper portion 102 by a collar 108. In assembly, the output drive shaft 100 is vertically received within a drive housing 120. The drive housing 120 includes a first vertical portion 122 and a generally horizontal portion 124. An aperture 126 is disposed between the vertical portion 122 and opens into the horizontal portion 124 and is adapted to receive a gearing mechanism that is powered by the output drive of the stand mixer 12 shown in FIG. 2 and further described below. The vertical portion 122 further includes a slot 123 which is adapted to receive and engage a locking feature disposed on the lip portion 44 of the top housing 40. The horizontal portion 124 of the drive housing 120 includes a generally semicircular portion 128 which vertically and rotatably receives the output drive shaft 100. In assembly, the output drive shaft 100 is adapted to rotate along a rotational path as indicated by arrow R2 to power and drive the food processing discs, such as rotational discs 80A and 80C, as coupled thereto. Thus, rotary attachment discs, such as slicing discs 80A and 80C include attachment portion 86 and central attachment features 86A which are adapted to be coupled to engagement portion 104 of the output drive shaft 100. As coupled thereto, the output drive shaft 100 will rotate along the vertical axis of rotational path R2 to rotate the discs 80A or 80C along rotational path R1 for processing a food substrate. Thus, engagement portion 104 is accessible through the upper portion 32A of the gear housing 32 when the top housing assembly 40, as shown in FIG. 3, is removed from the upper portion 32A of the gear housing 32. Further, lower portion 106 of the output drive shaft 100 is accessible through the lower portion 32B of the gear housing 32, as shown in FIG. 3, for attachment of a food processing attachment, such as food processing attachment 72 disposed within the bowl assembly 60 shown in FIG. 2A. As noted above, the output drive shaft 100 is adapted to power a slicing disc, such as disc 80A or 80C and a food processing assembly, such as food processing attachment 72, either individually or together. In this way, the food processing attachment 10 of the present disclosure can be used to slice a food substrate, dice a food substrate, provide julienne-style strips of a food substrate, or chop a food substrate.

It will also be appreciated that rotational discs, such as discs 80A and 80C, may include a ramped portion disposed thereon which is adapted to urge a food substrate along the food processing path A or even through the dicing elements 97, 99 of food processing attachment disc 80B.

Figure 5:
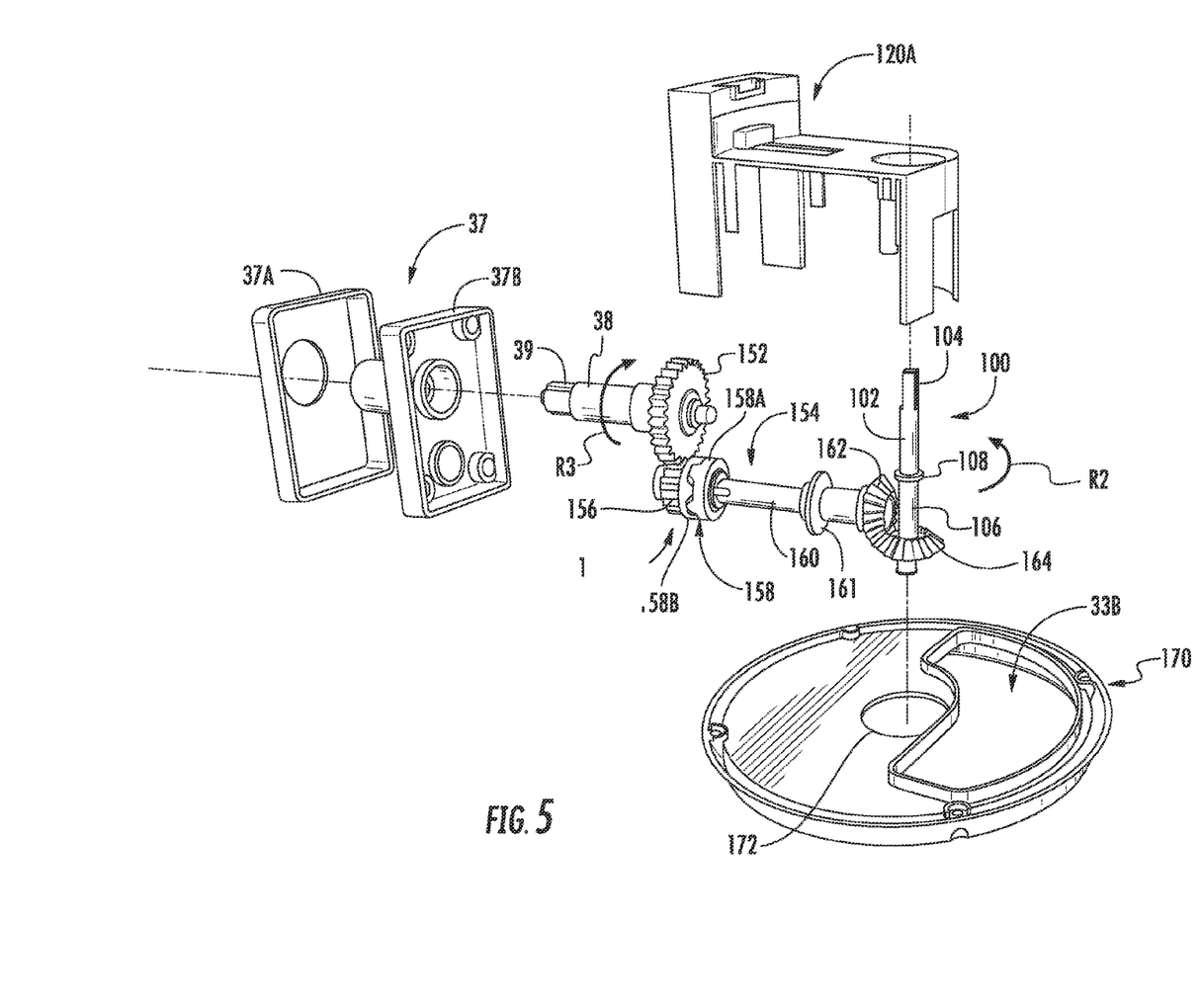
FIG. 5 is an exploded perspective view of a gearing mechanism.

Referring now to FIG. 5, the hub housing 37 is shown being a two-part hub housing having a first portion 37A and a second portion 37B which are adapted to house the drive shaft 38 and square coupling 39 in assembly. As further shown in FIG. 5, the drive shaft 38 is coupled to a gearing assembly or mechanism 150 which provides a gearing system to transfer a generally horizontal rotational movement of the drive shaft 38, as indicated by arrow R3 to a vertical rotational movement of output drive shaft 100 as shown by arrow R2. The gearing mechanism 150 includes a first gear 152 which is coupled to the drive shaft 38. First gear 152 is further coupled to a gear and clutch mechanism 154 which includes a second gear 156 which is gearingly engaged with first gear 152. A clutch mechanism 158 is disposed on a drive shaft 160 which is adapted to provide a slip function or disengagement function to the food processing attachment 10 should any of the food processing attachments become lodged in place.

As shown in FIG. 5, the clutch mechanism 158 includes first and second clutch plates 185A and 158B. Clutch plate 158B is coupled to second gear 156 and is gearingly engaged with the first clutch plate 158A as shown in FIG. 5. First clutch plate 158A is moveable along drive shaft 160 in a lateral manner, such that if a food item becomes lodged or wedged within the food processor mixer attachment 10, the clutch mechanism 158 is adapted to slip or otherwise allow first clutch plate 158A to move to a disengaged position relative to second clutch plate 158B. As further shown in FIG. 5, drive shaft 160 also includes an abutment portion 161 which is adapted to abut a biasing mechanism, such as a spring, to bias the first clutch plate 158A into an engaged condition with second clutch plate 158B. Thus, the first clutch plate 158A and a biasing mechanism, such as a spring, are configured to slide along the outer surface of drive shaft 160 to allow for disengagement of the shaft 160 from the first and second gears 152, 156 to prevent an overload condition. As noted above, the overload condition generally includes a condition wherein the cutting tools which are rotatably driven by the stand mixer 12 are lodged or wedged such that the power from the stand mixer 12 is not properly translated to the food processing attachment 10. In this condition, the clutch mechanism 158 is adapted to slip such that the drive outlet 38 and the output drive 100 are selectively configured in a driven engagement which can become disengaged when a threshold resistive force is realized on the clutch mechanism 158. Thus, the clutch mechanism 158 is adapted to avoid damage to the gearing mechanism 150 in an overload situation.

The drive shaft 160 further includes second gear 156 disposed at one end and a first bevel gear 162 disposed at the opposite end. Bevel gear 162 is a vertical bevel gear that is gearingly coupled to a horizontal bevel gear 164 disposed on the output drive shaft 100 at the lower portion 106. In this way, the horizontal rotational movement of the drive shaft 38 along the path indicated by arrow R3 translates through the gearing mechanism 150 to provide vertical rotation of the output drive shaft 100 in a rotational path as indicated by arrow R2. Thus, the stand mixer 12 is in a drive relationship with the good processor attachment via the gearing mechanism 150. As further shown in FIG. 5, the gearing mechanism 150 is generally disposed within a gearing mechanism housing 120A. A trim piece 170 includes a central aperture 172 for receiving the lower portion 106 of the output drive shaft 100 therein. The trim piece 170 further includes a lower feed aperture 33B which is adapted to align with feed aperture 33 of the gear housing 32.

Figure 6:
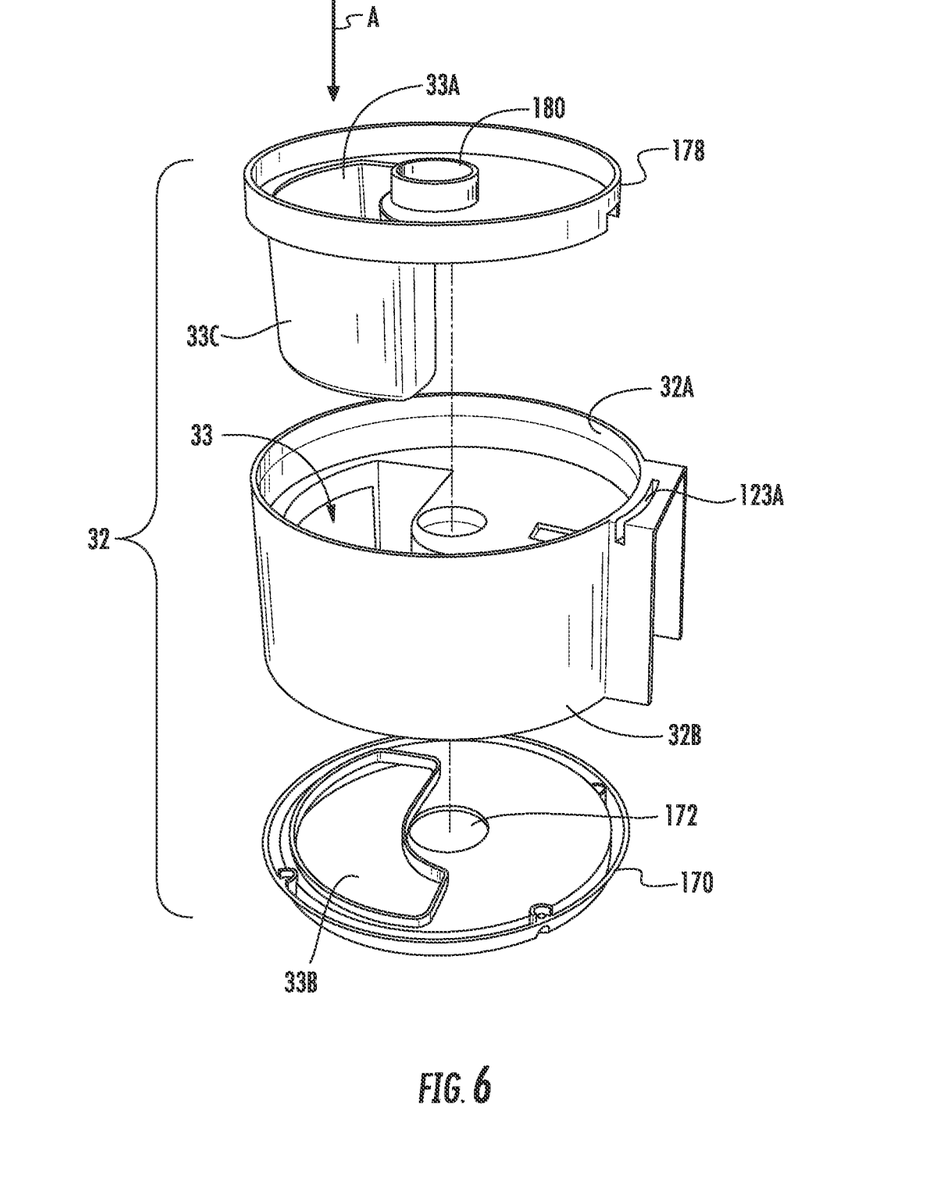
FIG. 6 is an exploded perspective view of a gear housing.

Referring now to FIG. 6, another embodiment of the gear housing 32 is shown having a liner member 178 adapted to be disposed within the upper portion 32A of the gear housing 32. The liner member 178 includes a centrally disposed aperture 180 which is adapted to receive the upper portion 104 of the output drive shaft 100 in assembly. The liner member 178 further includes an upper feed aperture 33A which is adapted to align with feed aperture 33 and lower feed aperture 33B in assembly. The liner member 178 further includes a downwardly extending feed aperture chute 33C which is adapted to run the length of feed aperture 33. In this way, the liner member 178 is adapted to protect the gear housing 32 as a food substrate passes along food processing path A, and also provides a removable element that can be separately washed after use.

Figure 7A:
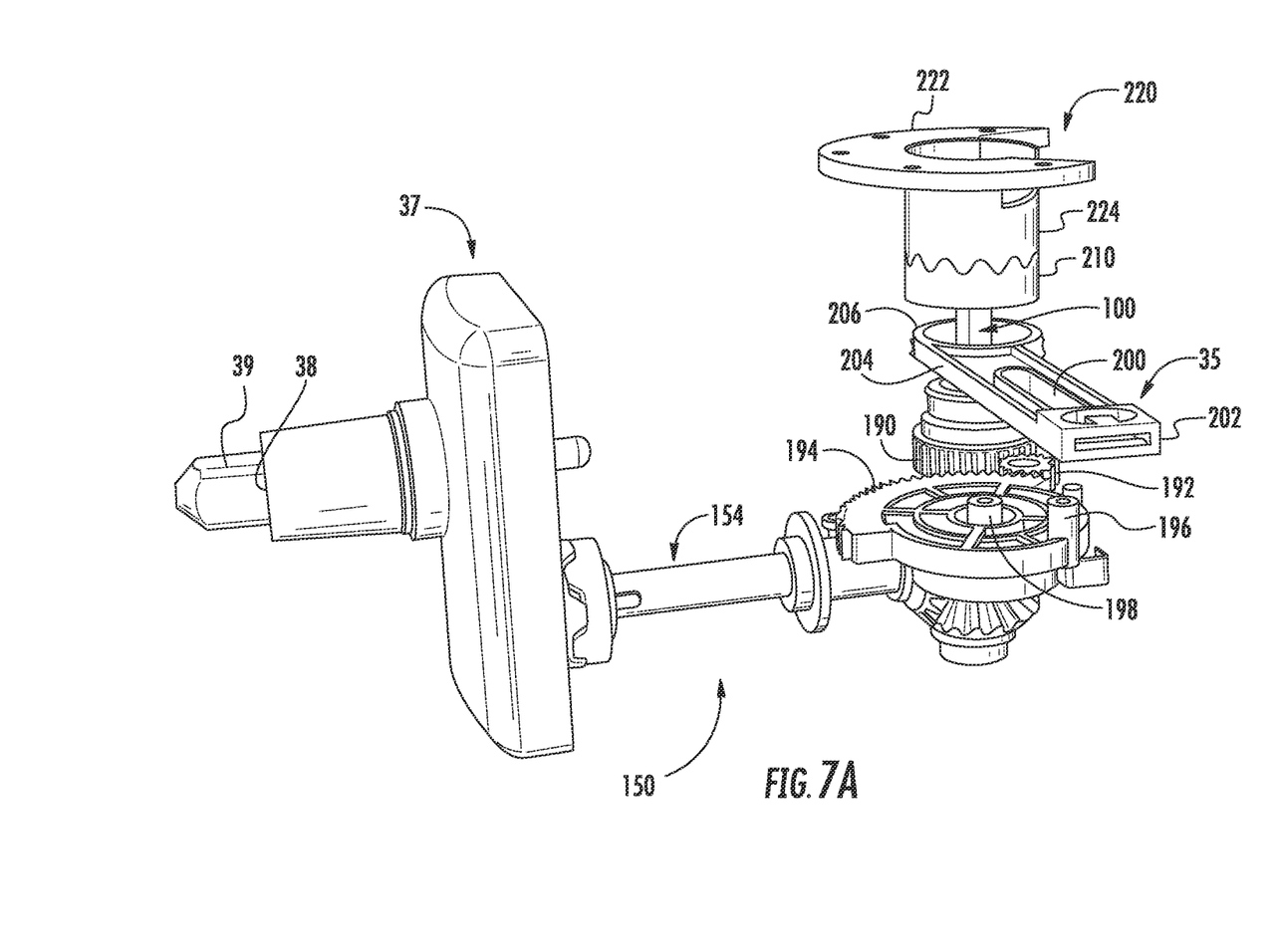
FIG. 7A is an exploded perspective view of a gearing mechanism.
Figure 7B:
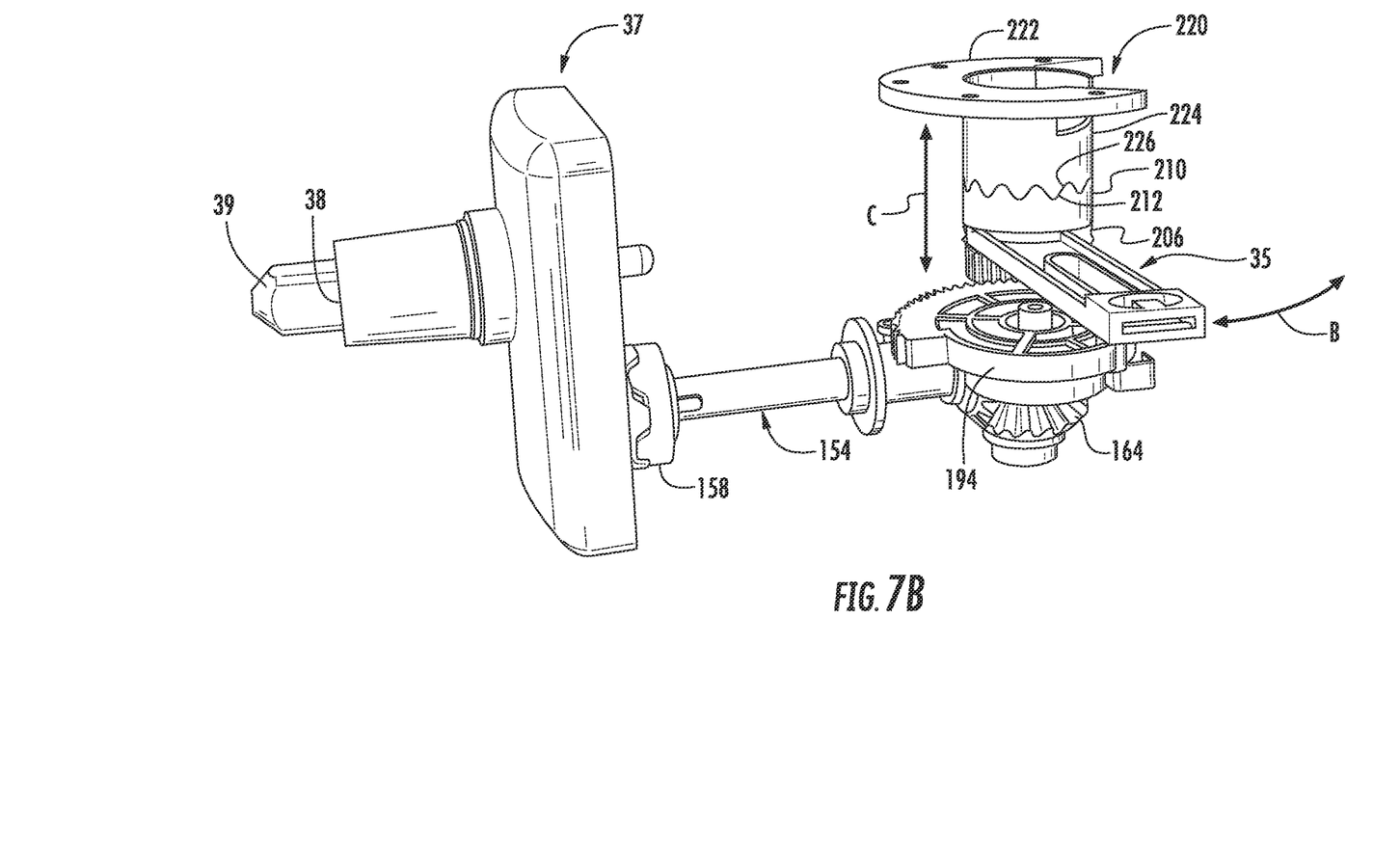
FIG. 7B is a perspective view of the gearing mechanism of FIG. 7A.

Referring now to FIGS. 7A and 7B, the gearing mechanism 150 is shown having an end gear 190 disposed on output drive shaft 100, which is gearingly engaged with a sector adjustment gear 194 through intermediate gear 192. The adjustment gear 194 includes coupling portions 196, 198 which are adapted to be disposed within an elongate aperture 200 disposed on lever mechanism 35. The lever mechanism 35, as described above, is an adjustable lever used to adjust the position of food processing attachment discs as disposed within the food processing attachment 10. Thus, the lever includes an end portion 202 which is adapted to couple to a handle portion as shown in FIG. 2B. The lever 35 further includes a body portion 204 having elongate aperture 200 disposed thereon. An end aperture 206 is disposed on an opposite end of the lever 35 relative to end portion 202 and is adapted to be disposed around output drive shaft 100. In assembly, as shown in FIG. 7B, the lever 35 is adapted to move along a path as indicated by arrow B to adjust the vertical position of an attachment disc. As the lever 35 moves along the path as indicated by arrow B, a height adjustment mechanism 200 includes a cammed upper surface 212 and is attached to the lever 35 at end aperture 206. The height adjustment mechanism 210 is engaged with a disc mounting member 220 which includes an upper mounting portion 222 and a base portion 224 having a cammed surface 226 which matingly engages cammed surface 212 of height adjustment mechanism 210. Thus, as the lever 35 moves along the path as indicated by arrow B, the cammed surfaces 212, 226 will cam against one another to adjust the vertical position of the mounting plate 220 in a path as indicated by arrow C. In this way, the lever 35 is adapted to be externally accessible through the gear housing 32 for adjusting the vertical position of food processing attachment discs as disposed within the food processing attachment 10, thereby determining the thickness of a processed food substrate.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

What is claimed is:

1. A food processor attachment assembly configured to be mounted as an attachment to a stand mixer, the stand mixer having a drive outlet attachment hub, the food processor attachment assembly comprising:
   a gear housing having a coupling hub configured to couple to the drive outlet attachment hub of the stand mixer, the gear housing having an upper portion and a lower portion;
   a gearing mechanism disposed within the gear housing, the gearing mechanism configured to engage the drive outlet attachment hub of the stand mixer at a first end in a driven relationship, and further coupled to an output drive shaft at a second end for turning the output drive shaft;
   a top housing assembly having a lid portion removably mounted on the upper portion of the gear housing;
   a bowl assembly removably mounted on the lower portion of the gear housing;
   a feed aperture disposed through the gear housing and configured to receive a food substrate for processing, the feed aperture being in communication with the top housing assembly and the bowl assembly to at least partially define a food processing path; and
   wherein the output drive shaft is configured to rotate on a vertical axis, the output drive shaft having an upper portion accessible from the upper portion of the gear housing and a lower portion accessible from the lower portion of the gear housing, and further wherein the upper and lower portions of the output drive shaft are configured to couple to and drive food processing attachments.

2. The food processor attachment assembly of claim 1, including:
   a first food processing attachment coupled to the upper portion of the output drive shaft, the first food processing attachment selectively movable through the food processing path to cut the food substrate as it passes through the food processing path.

3. The food processor attachment assembly of claim 2, wherein the first food processing attachment is a rotational slicing disc configured to rotate within a base portion of the top housing assembly as driven by the output drive shaft.

4. The food processor attachment assembly of claim 3, including:
   a second food processing attachment coupled to the lower portion of the output drive shaft, the second food processing attachment selectively movable through the food processing path to cut the food substrate as it passes through the food processing path.

5. The food processor attachment assembly of claim 4, wherein the second food processing attachment is a rotational chopping assembly configured to rotate within a receptacle portion of the bowl assembly as driven by the output drive shaft.

6. The food processor attachment assembly of claim 5, wherein the second food processing attachment includes a drive shaft coupled to the lower portion of the output drive shaft and one more blade assemblies coupled to the drive shaft.

7. A food processor attachment assembly configured to be mounted on an appliance having a rotary drive outlet driven by a motor of said appliance, the food processor attachment assembly comprising:
   a housing assembly and a bowl assembly, the housing assembly and bowl assembly removably mounted to opposite ends of a gear housing;
   a coupling hub disposed on the gear housing and configured to be coupled to the rotary drive outlet of said appliance;
   an output drive disposed within the gear housing, the output drive configured to be engaged in a driven relationship with the rotary drive outlet of the appliance to rotate the output drive within the gear housing; and
   wherein the output drive includes an upper portion disposed within the housing assembly and a lower portion disposed within the bowl assembly, and further wherein the upper portion of the output drive is coupled to and rotationally drives a first food processing attachment and the lower portion of the output drive is coupled to and rotationally drives a second food processing attachment.

8. The food processor attachment assembly of claim 7, including:
   a feed aperture disposed through the gear housing and configured to receive a food substrate for processing, the feed aperture in communication with the housing assembly and the bowl assembly to at least partially define a food processing path.

9. The food processor attachment assembly of claim 8, wherein the housing assembly includes a base portion and a feed chute upwardly extending from the base portion.

10. The food processor attachment assembly of claim 9, including:
    a food pusher assembly slideably received in the feed chute and configured to urge a food substrate along the food processing path.

11. The food processor attachment assembly of claim 10, wherein the food pusher assembly includes first and second food pushers, the second food pusher slideably received within a body portion of the first food pusher.

12. The food processor attachment assembly of claim 11, wherein the first food processing attachment is a rotational slicing disc configured to rotate within the base portion of the housing assembly.

13. The food processor attachment assembly of claim 12, wherein the second food processing attachment is a rotational chopping assembly configured to rotate within the bowl assembly.

14. A food processor attachment assembly configured to be mounted as an attachment to a stand mixer, the stand mixer having a motor, an attachment hub and a drive outlet disposed in the attachment hub and driven by the motor, the food processor attachment assembly comprising:
- a gear housing having a coupling hub configured to couple to the attachment hub of the stand mixer, the gear housing having upper and lower portions with a feed aperture extending therethrough;
- a top housing assembly removably mounted to the upper portion of the gear housing;
- a bowl assembly removably mounted to the lower portion of the gear housing;
- a vertically disposed output drive housed within the gear housing and configured to be in a driven engagement with the drive outlet of the stand mixer to rotate the output drive along a vertical axis, wherein the output drive is at least partially disposed in the bowl assembly; and
- a food processing attachment removably coupled to the output drive for processing a food substrate in a receptacle portion of the bowl assembly.

15. The food processor attachment assembly of claim 14, wherein the top housing assembly includes an upwardly extending feed chute and a base portion, top housing assembly removably mounted to the upper portion of the gear housing at the base portion, and the feed chute disposed above the feed aperture to at least partially define a food processing path.

16. The food processor attachment assembly of claim 15, including:
- a stationary food processing disc received in the base portion of the top housing assembly, the stationary food processing disc having a dicing grid disposed adjacent to and above the feed aperture for processing a food substrate received along the food processing path.

17. The food processor attachment assembly of claim 16, wherein the food processing attachment includes a drive shaft coupled to a lower portion of the output drive and one more blade assemblies coupled to the drive shaft to process a food substrate as received in the bowl assembly.

18. The food processor attachment assembly of claim 17, wherein the bowl assembly includes and upper lip portion removably mounted to the lower portion of the gear housing, and further includes an alignment aperture disposed on the upper lip portion.

19. The food processor attachment assembly of claim 18, including:
- an alignment feature disposed on the lower portion of the gear housing, the alignment feature configured to be received in the alignment aperture of the upper lip portion of the bowl assembly.

* * * * *